United States Patent [19]

Theising

[11] Patent Number: 5,040,302

[45] Date of Patent: Aug. 20, 1991

[54] HITCH ALIGNMENT MEANS

[76] Inventor: Stephen P. Theising, 110 St. Antoine, Florissant, Mo. 63031

[21] Appl. No.: 548,485

[22] Filed: Jul. 3, 1990

[51] Int. Cl.$^5$ ............................................. G01C 15/00
[52] U.S. Cl. ..................................... 33/286; 33/645; 33/264; 116/28 R
[58] Field of Search ................. 33/264, 600, 645, 286, 33/288, 481; 110/28 R; 280/477; 188/32; 404/6

[56] References Cited

U.S. PATENT DOCUMENTS

| | | | |
|---|---|---|---|
| 2,835,978 | 5/1958 | Krisel | 33/481 |
| 3,209,662 | 10/1965 | Morton | 404/6 |
| 4,627,634 | 12/1986 | Coleman | 33/264 X |

FOREIGN PATENT DOCUMENTS

| | | | |
|---|---|---|---|
| 577219 | 6/1959 | Canada | 116/28 R |
| 1073593 | 3/1954 | France | 404/6 |
| 1250144 | 11/1960 | France | 188/32 |

Primary Examiner—Harry N. Haroian
Attorney, Agent, or Firm—Haverstock, Garrett & Roberts

[57] ABSTRACT

A hitch alignment device for aligning a hitch coupling of a wheeled towing vehicle with a mating hitch coupling of a towed vehicle, comprising an elongated base member and a cross member projecting sidewardly therefrom, the base and cross member having ground engaging surfaces and each having an upwardly projecting side portion, which side portions of the base and cross member adjoin one another, such side portion of the base member including a substantially planar lateral guide surface extending along the base member a distance sufficient to extend along at least a portion of a wheel assembly of the towing vehicle when the wheel assembly is substantially laterally positioned thereto and in proximate engagement therewith, such side portion of the cross member including a lateral stop surface extending sidewardly from the adjoining side portion of the base member a distance sufficient to engage at least a portion of the width of the wheel assembly of the towing vehicle when the wheel assembly is in engagement with the lateral stop surface and substantially laterally positioned adjacent to and in proximate engagement with the lateral guide surface of the base member.

20 Claims, 3 Drawing Sheets

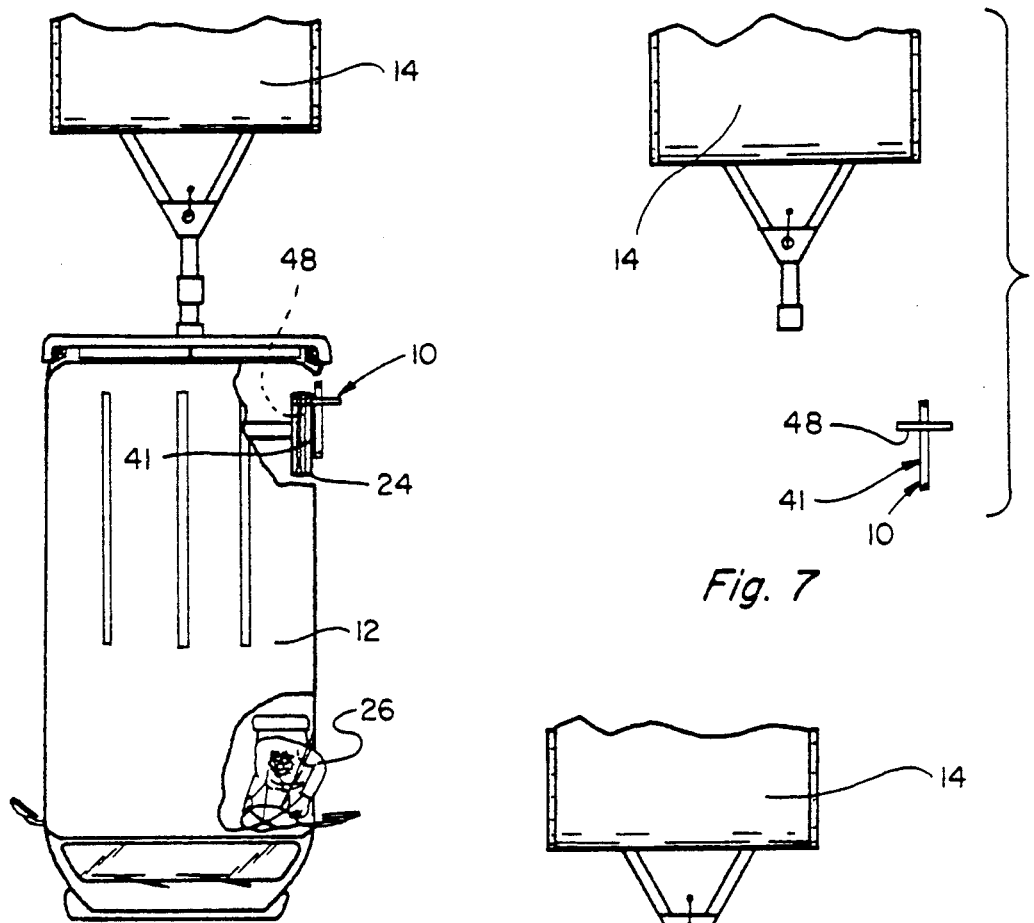
Fig. 7
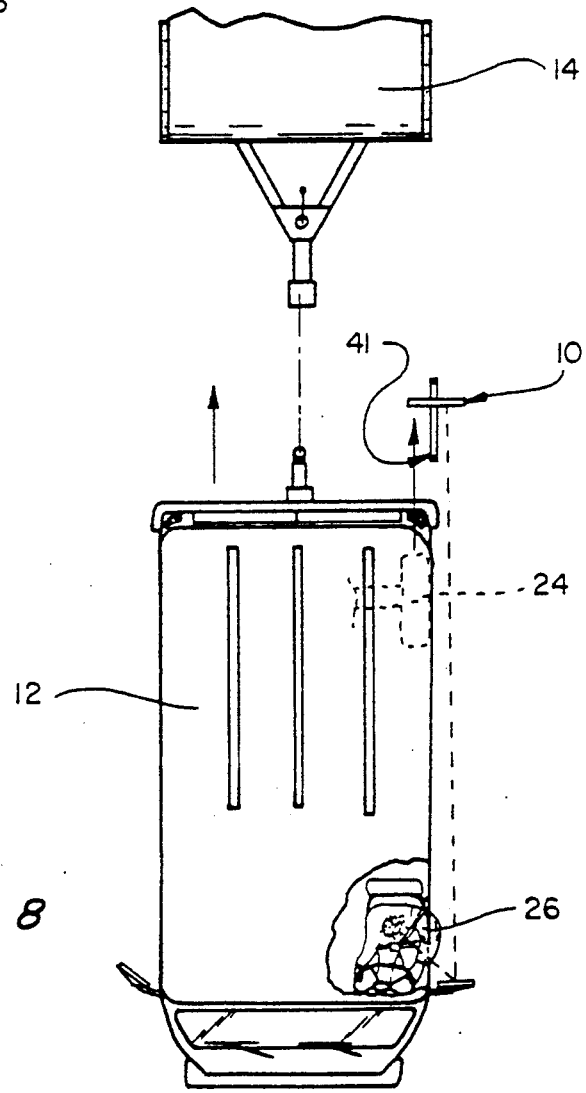
Fig. 6
Fig. 8

HITCH ALIGNMENT MEANS

BACKGROUND OF THE INVENTION

The present invention relates to a means for aligning vehicle hitch assemblies, and, more particularly, to a hitch alignment means which aids a driver in aligning a coupling hitch portion associated with a towing vehicle with a mating coupling hitch portion associated with a towed vehicle.

Hitch assemblies for coupling a towing vehicle, such as a truck, to a towed vehicle, such as a trailer, are well known. Commonly, hitch assemblies include a ball device connected to or otherwise associated with a towing vehicle and a complementarily engageable socket device connected to or otherwise associated with a towed vehicle. Typically, such ball and socket devices are located at bumper level of the towing vehicle and towed vehicle and out of line-of-sight view of the driver. Aligning such devices, especially without the help of someone directing the driver, is difficult and frequently requires a number of trial and error attempts at alignment, which is time consuming and, in many instances, frustrating to the driver of the towing vehicle.

Many alignment devices have been proposed in the past in attempts to solve the problems of aligning vehicle hitch assemblies. Some of such devices are disclosed in U.S. Pat. No. 3,084,953; U.S. Pat. No. 4,169,610; U.S. Pat. No. 4,614,356; and U.S. Pat. No. 4,627,634. Many of such alignment devices have taken the form of two piece constructions, one piece of which is attached to the towing vehicle and the other piece of which is attached to the towed vehicle, the separate pieces of which are mounted upon the vehicles in positions more visible to the operator of the towing vehicle and in such fashion that the two pieces of such construction are engaged with one another whenever the hitch assembly portions of the towed vehicle and the towing vehicle are in alignment. When such devices are utilized, alignment of the hitch assemblies can be realized by bringing the two separate pieces of the alignment devices into proper engagement, the accomplishment of which has generally still required some, hopefully lesser, number of trial and error attempts at alignment. It has been found that significant skill, and often times a great deal of time, is required in order to properly position the towing vehicle to effect the required engagement of the two pieces together. Additionally, many of such devices have been relatively complicated in design and have required users thereof to exercise significant care in the positionings of the two pieces thereof on the respective vehicles so that proper engagement of such pieces will result in the desired alignment of the vehicle hitch assemblies. In view of such factors, there has thus remained a need for a hitch alignment means which is of simple design and construction and easy to use.

The present invention is designed to obviate and overcome many of the disadvantages and shortcomings experienced with the alignment devices discussed hereinbefore and with other alignment devices used in the past, and to provide a hitch alignment meals which can be easily utilized to align vehicle hitch assemblies. Moreover, since the hitch alignment means of the present invention need not be attached to either the towing or towed vehicle, it offers the advantage that no modifications to either of the towing or towed vehicles are required.

SUMMARY OF THE INVENTION

The hitch alignment means of the present invention is designed and intended for use with a wheeled towing vehicle that has at least one wheel assembly capable of a configuration having an established relationship with the hitch coupling and that is operable to position the configured wheel assembly in a desired location to align the hitch coupling associated with the wheeled towing vehicle with a complementarily engageable mating hitch coupling associated with a towed vehicle. Basically, the alignment means comprises an elongated base member and a cross member projecting sidewardly from the base member. Such base member has a ground engaging surface with an elongated edge extending along one side thereof, an alignment portion extending upwardly from the ground engaging surface, which alignment portion has an exterior surface encompassing the edge and extending upwardly therefrom. Such exterior surface forms a side of the alignment portion, at least a portion of which defines a guide means which preferably takes the form of a substantially planar lateral guide surface extending along at least a portion of the base member. The lateral guide surface is dimensioned to extend along at least a portion of the outer surface of the configured wheel assembly of the wheeled towing vehicle when such wheel assembly is substantially laterally positioned adjacent thereto and in proximate engagement therewith. The cross member is positioned to project sidewardly from the lateral guide surface of the base member. Such cross member has a ground engaging surface and a wheel stop portion extending upwardly therefrom, which wheel stop portion has a lateral stop surface adjoining the inner side of the alignment portion of the base member and extending sidewardly therefrom. The wheel stop portion and the lateral stop surface thereof are dimensioned to project sidewardly from the base member a distance sufficient to engage at least a portion of the width of the configured wheel assembly of the wheeled towing vehicle when such wheel assembly is positioned with a portion of the outer surface thereof substantially laterally positioned adjacent to and in proximate engagement with the lateral guide surface of the alignment portion of the base member and to inhibit the passage of the configured wheel assembly thereover.

Such alignment means is positionable upon the ground with the lateral guide surface of the alignment portion of the base member and the lateral stop surface of the wheel stop portion of the cross member in engagement with the configured wheel assembly while the wheeled towing vehicle and the towed vehicle are coupled to one another. The positioned hitch alignment means thus establishes an alignment configuration for the towing vehicle with respect to the towed vehicle, and such alignment configuration is thereafter maintainable while the towed vehicle remains in position, even while the towing vehicle is uncoupled from the towed vehicle and moved elsewhere. Securing means may optionally be provided and employed to secure the alignment means in proper position and to prevent accidental or inadvertent movement of the alignment means out of position.

In light of the foregoing comments, it will be recognized that a principal object of the present invention is to provide an improved hitch alignment means.

A further object of the invention is to provide a hitch alignment means which is of simple construction and design and which can be easily employed with highly reliable results.

Another object of the invention is to provide an improved hitch alignment means which may be of one piece construction and which does not require attachment to either the towing vehicle or the towed vehicle.

These and other objects and advantages of the present invention will become apparent after considering the following detailed specification in conjunction with the accompanying drawings, wherein:

BRIEF DESCRIPTION OF THE DRAWINGS

FIG. 2 is a top plan view of the hitch alignment means of FIG. 1;

FIG. 3 is a side view of the hitch alignment means of FIG. 1;

FIG. 4 is an end view of the hitch alignment means of FIG. 1;

Fig. 7 is a top plan view, similar to FIG. 6, but with the towing vehicle removed; and FIG. 8 is a top plan view similar to FIGS. 6 and 7, but showing the towing vehicle returning and backing into proper position, using the hitch alignment means of FIG. 1, to attain hitch assembly alignment.

DETAILED DESCRIPTION OF THE PREFERRED EMBODIMENT

Figure 1:
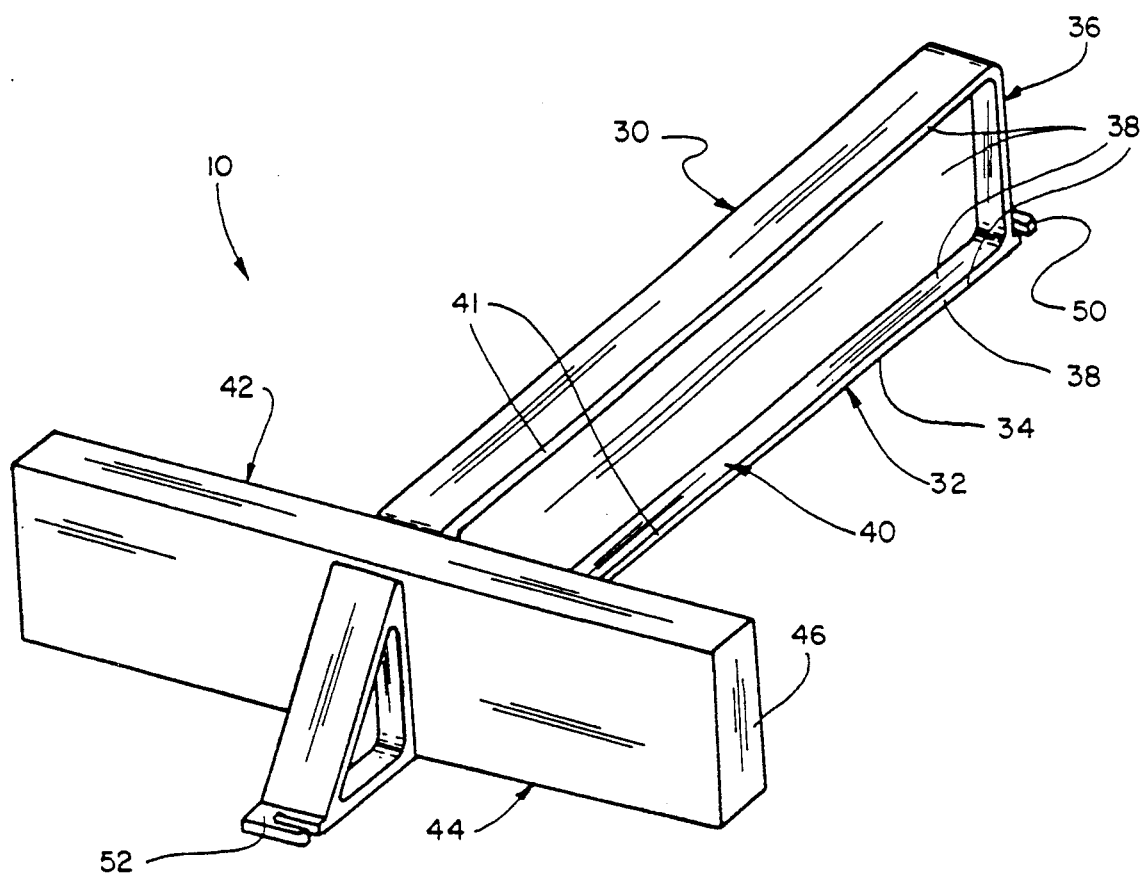
FIG. 1 is a perspective view of a preferred embodiment of a hitch alignment means constructed according to the present invention.

Referring now to the drawings, wherein like numbers refer to like items, number 10 identifies a preferred embodiment of the hitch alignment means of the present invention, which embodiment, as is most clearly depicted in FIGS. 1-4, includes an elongated base member 30 having a ground engaging surface 32 with an elongated edge 34 extending along one side thereof. An alignment portion 36 extends upwardly from the ground engaging surface 32 and has an exterior surface 38 encompassing the edge 34 and extending upwardly therefrom. Such exterior surface 38 forms an inner side 40 of the alignment portion 36 and defines a substantially planar lateral guide surface 41 along the base member 30. The lateral guide surface is dimensioned to extend along at least a portion of the lowermost part of the outer surface of a configured wheel assembly 24 of a wheeled towing vehicle 12 when the wheel assembly 24 is substantially laterally positioned adjacent thereto and in proximate engagement therewith, as is most clearly depicted in FIGS. 5, 6, and 8.

With reference, again, primarily to FIGS. 1-4, a cross member 42 projects sidewardly from the base member 30 and the lateral guide surface 41 thereof. The cross member 42 has a ground engaging surface 44 and a wheel stop portion 46 which extends upwardly therefrom. The wheel stop portion 46 has a lateral stop surface 48 adjoining the inner side 40 of the alignment portion 36 of the base member 30 and extending sidewardly therefrom. The wheel stop portion 46 and the lateral stop surface 48 thereof are dimensioned to project sidewardly from the base member 30 a distance sufficient to engage at least a portion of the width of the configured wheel assembly 24 of the wheeled towing vehicle 12 when the wheel assembly 24 is positioned with a portion of the outer surface thereof substantially laterally positioned adjacent to and in proximate engagement with the lateral guide surface 41 of the alignment portion 36 of the base member 30 and to inhibit the passage of the configured wheel assembly 24 thereover, as is most clearly depicted in FIGS. 5, 6, and 8.

Figure 5:
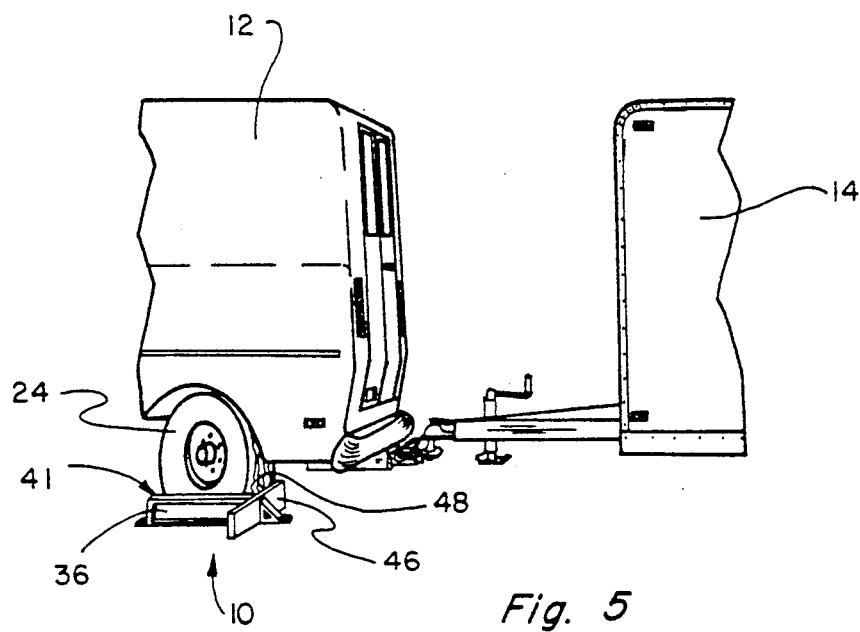
FIG. 5 is a view depicting the positioning of the hitch alignment means of FIG. 1 in proper position for alignment of the vehicle hitch assemblies while the towing vehicle and the towed vehicle remain coupled.
Figure 6:
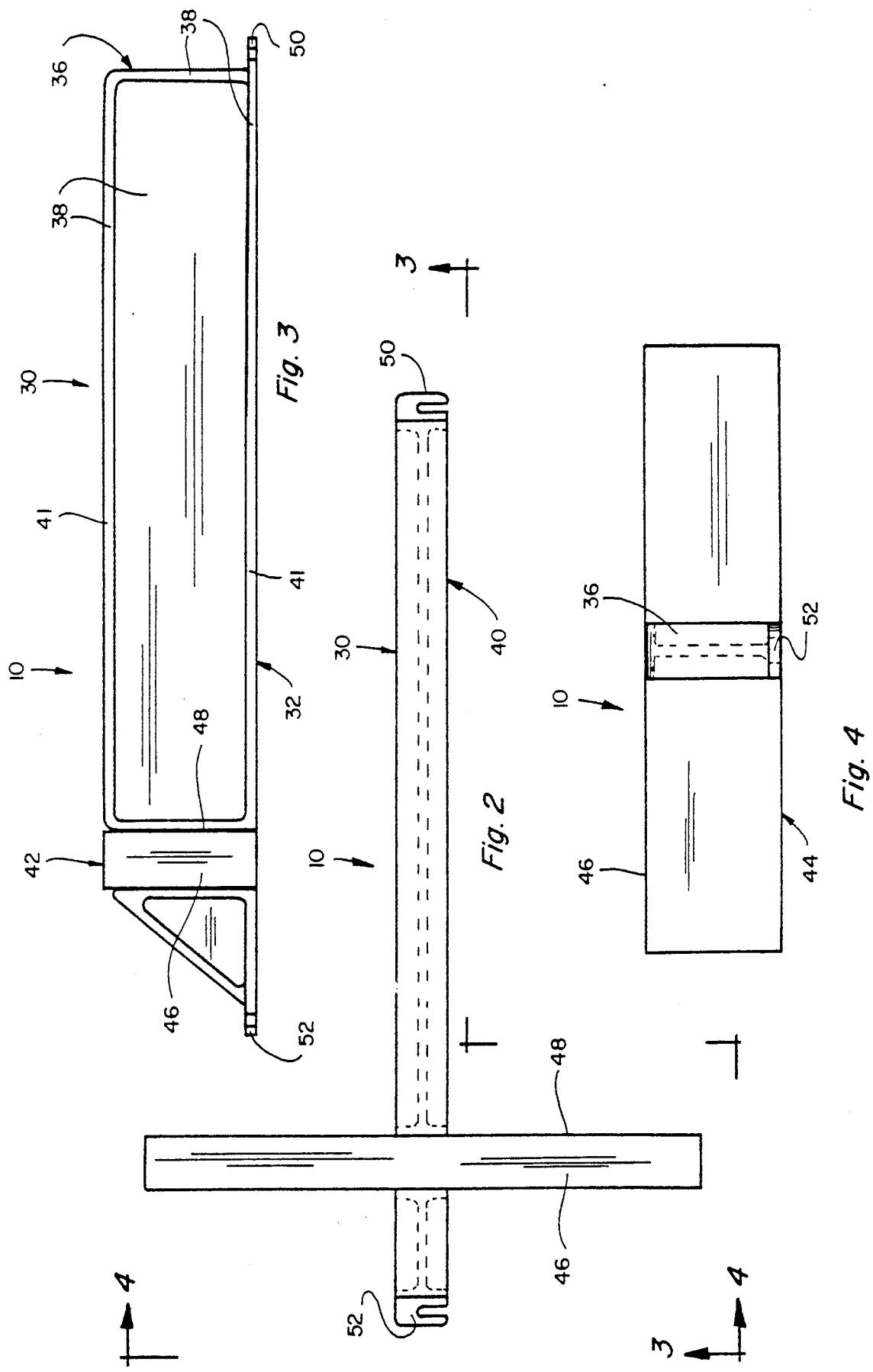
FIG. 6 is a top plan view corresponding to FIG. 5.

As shown in FIGS. 5 and 6, in use, such hitch alignment means 10 may be placed upon the ground surface with the lateral guide surface 41 positioned adjacent to and in proximate engagement with at least a portion of the lowermost part of the outer surface of the configured wheel assembly 24 of the wheeled towing vehicle 12 and with the lateral stop surface 48 of wheel stop portion 46 of cross member 42 in engagement with at least a portion of the width of the configured wheel assembly 24 of the wheeled towing vehicle 12. Such positioned hitch alignment means 10 establishes an alignment configuration for the towing vehicle 12 with respect to the towed vehicle 14. The hitch alignment means 10 can be secured in place at such position by the use of optional securing means, which can take many forms. In the preferred embodiment 10, tabs 50 and 52 are provided and are designed for use with securing pins or spikes for maintaining the hitch alignment means in the proper position.

With the hitch alignment means 10 thus in place, the towing vehicle 12 and a towed vehicle 14 may be uncoupled from one another and the towing vehicle 12 may leave, as is depicted in FIG. 7. So long as the towed vehicle 14 is not moved and the hitch alignment means 10 remains in place, the hitch alignment means 10 can be readily employed during re-alignment operations upon a return of the towing vehicle to realize proper alignment of the ball and socket members of the vehicle hitch assemblies so that the towed vehicle and towing vehicle can again be coupled to one another.

In practice, as is depicted in FIG. 8, re-alignment can be readily accomplished upon return of the towing vehicle 12 by backing the towing vehicle 12 into place, similarly to parallel parking, such that at least a portion of the lowermost part of the outer surface of wheel assembly 24 of the towing vehicle 12 is positioned substantially laterally adjacent to the lateral guide surface 41 of base member 30 and in proximate engagement therewith and such that at least a portion of the width of the configured wheel assembly 24 is in engagement with lateral stop portion 48 of the wheel stop portion 46 of cross member 30.

In the preferred embodiment 10, base member 30 and cross member 42 define a T-shaped construction in which the alignment portion 36 forms a centrally located stem portion, depicted as a rail-like member having a generally I-shaped cross section such that both sides thereof are substantially identical, and the arms of the cross member 42, both of which arms are shown as being of like configuration and cross-section, are disposed perpendicular to the alignment portion 36. As described, one of such arms includes lateral stop surface 48 which serves as a contacting reference for a driver 26 of the towing vehicle 12 when he is backing the towing vehicle 12 into place. The other arm serves as a sighting reference for the driver 26.

Although the preferred embodiment is of a T-shape, it should be recognized that the hitch alignment means of the present invention may take many different forms and shapes. For example, configurations of generally L-shape and U-shape are possible, and the cross member may intersect the base member at various angles other than 90 degrees.

It should be further recognized that the hitch alignment means of the present invention can be constructed of various materials and can be assembled from separable components or formed as a unitary construction. Preferably, the hitch alignment means will be of relatively lightweight material so that it can be easily positioned, secured in place, removed, and transported elsewhere for use.

Although the preferred embodiment of the invention has been described and depicted hereinabove in terms of its positioning with respect to a rear wheel of the towing vehicle, it should be recognized that it could be employed in association with any wheel of a towing vehicle that is capable of a configuration having an established relationship with the hitch coupling thereof. Since the rear wheel of the towing vehicle as described and depicted hereinabove is fixed and not steerable or rotatable, such wheel is always in a configuration having an established relationship with the hitch coupling of the towing vehicle. A steerable or rotatable wheel, though, is capable of various configurations. The hitch alignment means may be employed with such a wheel, but, if so used, in order to ensure that proper alignment can be achieved, the wheel must be so steered or rotated that the wheel is placed in a requisite relationship with the coupling hitch. Typically, if the coupling hitch is located on or along the center line of the vehicle, or a line substantially parallel thereto, the wheel with which the hitch alignment means is employed will be a wheel that is configured, or that is capable of being configured, such that the wheel, if not thereafter reconfigured, would track a line substantially parallel to the center line of the vehicle.

From all that has been said, it will be clear that there has thus been shown and described herein a hitch alignment means which fulfills the various objects and advantages sought therefor. It will be apparent to those skilled in the art, however, that many changes, modifications, variations, and other uses and applications of the subject hitch alignment means are possible and contemplated. All changes, modifications, variations, and other uses and applications which do not depart from the spirit and scope of the invention are deemed to be covered by the invention, which is limited only by the claims which follow.

What is claimed is:

1. A means for aligning a hitch coupling of a wheeled towing vehicle with a mating hitch coupling of a towed vehicle, such wheeled towing vehicle having at least one wheel assembly capable of a configuration having an established relationship with the hitch coupling thereof and being operable to position such configured wheel assembly in a desired location, said alignment means comprising an elongated base member having a ground engaging surface with an elongated edge extending along one side thereof, an alignment portion extending upwardly from said ground engaging surface, said alignment portion having an exterior surface encompassing said edge and extending upwardly therefrom to inhibit the passage of a wheel assembly over said alignment portion, said exterior surface forming an inner side of said alignment portion and including a portion defining guide means along said base member said guide means dimensioned to extend along at least a portion of the outer surface of the configured wheel assembly of the wheeled towing vehicle when such wheel assembly is substantially laterally positioned adjacent thereto and in proximate engagement therewith, a cross member projecting sidewardly from said base member and said guide means thereof, said cross member having a ground engaging surface and a wheel stop portion extending upwardly therefrom, said wheel stop portion having a lateral stop surface adjoining said inner side of said alignment portion of said base member and extending sidewardly therefrom said wheel stop portion and said lateral stop surface thereof being dimensioned to project sidewardly from said base member a distance sufficient to engage at least a portion of the width of the configured wheel assembly of the wheeled towing vehicle when such wheel assembly is positioned with a portion of the outer surface thereof substantially laterally positioned adjacent to and in proximate engagement with said guide means of said alignment portion of said base member and to inhibit the passage of the configured wheel assembly thereover, such engagement defining an alignment engagement, said elongated base member and said cross member defining two sides of a generally triangular shaped baseless sector unbounded along at least a portion of the third side thereof such that said alignment means can be transported to the location of wheeled towing vehicle and towed vehicle coupled thereto and installed for use by moving said alignment means to a position adjacent the configured wheel assembly of the towing vehicle such that at least a portion of the configured wheel assembly is located within said generally triangular shaped sector, sad alignment means being further positionable upon the ground with said guide means of said alignment portion of said base member and said lateral stop surface of said wheel stop portion of said cross member in alignment engagement with the configured wheel assembly while the wheeled towing vehicle and the towed vehicle are in towing alignment with one another, said positioned alignment means establishing an alignment configuration for the towing vehicle with respect to the towed vehicle, such alignment configuration thereafter being maintainable while the towed vehicle remains in position even while the towing vehicle is uncoupled from the towed vehicle and moved elsewhere, whereby the towing vehicle can, upon the return thereof, be repositioned in such alignment configuration by operating such towing vehicle to reposition the configured wheel assembly with a portion of the outer surface thereof in proximate engagement with the guide means of said alignment portion while such wheel assembly is substantially laterally positioned adjacent thereto with at least a portion of the width of such configured wheel assembly in engagement with the lateral stop surface of said wheel stop portion of said cross member.

2. The alignment means of claim 1 wherein said guide means is a substantially planar lateral guide surface.

3. The alignment means of claim 2 wherein said lateral guide surface includes a substantially horizontally extending flange spaced above said ground engaging surface of said base member.

4. The alignment means of claim 1 including means for securing said base member and said cross member to the ground.

5. The alignment means of claim 4 wherein the securing means comprises tabs located at opposite ends of the base member.

6. The alignment means of claim 1 wherein said cross member is transverse to said base member.

7. The alignment means of claim 6 wherein said cross member and said base member define a generally T-shaped assembly.

8. The alignment means of claim 1 wherein said exterior surface forming the inner side of said alignment portion includes a substantially planar lateral face.

9. The alignment means of claim 8 wherein said lateral face is essentially perpendicular to said ground engaging surface of said base member.

10. The alignment means of claim 1 wherein said alignment portion includes an upwardly projecting central blade portion having first and second sides, said first side being said inner side of said alignment portion and said second side forming an outer side of said alignment portion.

11. The alignment means of claim 10 wherein said cross member includes first and second opposed arms each projecting sidewardly from said base member, said first arm extending sidewardly from said first side of said alignment portion and said second arm extending sidewardly from said second side of said alignment portion.

12. Means for aligning a hitch coupling of a wheeled towing vehicle with a mating hitch coupling of a towed vehicle, such wheeled towing vehicle having at least one wheel assembly capable of a configuration having an established relationship with the hitch coupling thereof and being operable to position such configured wheel assembly in a desired location, said means comprising an elongated base member and a cross member, including first and second opposed arms, disposed transverse to said base member with said arms thereof extending outwardly from said base member, said base and cross members having ground engaging surfaces, said base member including an elongated rail-like projection extending upwardly from said ground engaging surface of said base member to inhibit the passage of a wheel assembly thereover and extending along at least a portion of the length of said base member and having first and second side surfaces, said first side surface adjoining said first arm and said second side surface adjoining said second arm, at least one of which said side surfaces includes a portion defining guide means along at least a portion of said base member and dimensioned to extend along at least a portion of the outer surface of the configured wheel assembly of the wheeled towing vehicle when such wheel assembly is substantially laterally positioned adjacent thereto and in proximate engagement therewith, the arm of said cross member which adjoins said one side surface including a wheel stop portion extending upwardly from the ground engaging surface of said cross member, said wheel stop portion having a lateral stop surface adjoining the side surface of said rail-like projection, said wheel stop portion and said lateral stop surface thereof being dimensioned to project outwardly from said base member a distance sufficient to engage at least a portion of the width of the configured wheel assembly of the wheeled towing vehicle when such wheel assembly is positioned with a portion of the outer surface thereof substantially laterally positioned adjacent to and in proximate engagement with said guide means of said base member and to inhibit the passage of the configured wheel assembly thereover, such engagement defining an alignment engagement, said elongated base member and said cross member defining two sides of a generally triangular shaped baseless sector unbounded along at least a portion of the third side thereof such that said alignment means can be transported to the location of wheeled towing vehicle and a towed vehicle coupled thereto and installed for use by moving said alignment means to a position adjacent the configured wheel assembly of the towing vehicle such that at least a portion of the configured wheel assembly is located within said generally triangular shaped sector, said hitch alignment means being further positionable upon the ground with said guide means of said base member and said lateral stop surface of said wheel stop portion of said cross member in alignment engagement with the configured wheel assembly while the wheeled towing vehicle and the towed vehicle are in towing alignment with one another, said positioned means establishing an alignment configuration for the towing vehicle with respect to the towed vehicle, such alignment configuration thereafter being maintainable while the towed vehicle remains in position even while the towing vehicle is uncoupled from the towed vehicle and moved elsewhere, whereby the towing vehicle can, upon the return thereof, be repositioned in such alignment configuration by operating such towing vehicle to reposition the configured wheel assembly with a portion of the outer surface thereof in proximate engagement with the guide means of said base member while such wheel assembly is substantially laterally positioned adjacnet thereto with at least a portion of the width of such configured wheel assembly in engagement with the lateral stop surface of said wheel stop portion of said cross member.

13. The hitch alignment means of claim 12 wherein said portion of said side surface defining guide means is a substantially planar lateral surface.

14. The hitch alignment means of claim 13 wherein said substantially planar lateral surface is perpendicular to said ground engaging surface of said base member.

15. The hitch alignment means of claim 14 wherein said substantially planar lateral surface includes a portion thereof spaced above said ground engaging surface of said base member and extending along said base member.

16. The hitch alignment means of claim 12 including means for securing said base member and said cross member to the ground.

17. The hitch alignment means of claim 16 wherein said securing means comprises tabs located at opposite ends of the base member.

18. The hitch alignment means of claim 12 wherein said first and second side surfaces of said rail-like projection of said base member are of substantially like configuration.

19. The hitch alignment means of claim 18 wherein said first and second arms of said cross member are of substantially identical cross-section.

20. Hitch alignment means for aligning a hitch coupling of a wheeled towing vehicle with a mating hitch coupling of a towed vehicle, comprising an elongated base member and a cross member projecting sidewardly therefrom, the base and cross member having ground engaging surfaces and each having an upwardly projecting side portion dimensioned to inhibit the passage of a wheel assembly thereover, which side portions of the base and cross member adjoin one another, such side portion of the base member including a substantially planar lateral guide surface extending along the base member a distance sufficient to extend along at least a portion of a wheel assembly of the towing vehicle when the wheel assembly is substantially laterally positioned adjacent thereto and in proximate engagement therewith, such side portion of the cross member including a lateral stop surface extending sidewardly from the adjoining side portion of the base member a distance sufficient to engage at least a portion of the width of the wheel assembly of the towing vehicle when the wheel assembly is in engagement with the lateral stop surface and substantially laterally positioned adjacent to and in proximate engagement with the lateral guide surface of the base member, such engagement defining an alignment engagement, said elongated base member and said cross member defining two sides of a generally triangular shaped baseless sector unbounded along at least a portion of the third side thereof such that said alignment means can be transported to the location of wheeled towing vehicle and a towed vehicle coupled thereto and installed for use by moving said alignment means to a position adjacent the configured wheel assembly of the towing vehicle such that at least a portion of the configured wheel assembly is located within said generally triangular shaped sector, which hitch alignment device, when so positioned with respect to the wheel assembly of the towing vehicle and in alignment engagement, establishes an alignment configuration for the towing vehicle with respect to the towed vehicle, such alignment configuration thereafter being maintainable while the towed vehicle remains in position even while the towing vehicle is uncoupled from the towed vehicle and moved elsewhere, whereby the towing vehicle can, upon the return thereof, be repositioned in such alignment configuration by operating such towing vehicle to reposition the configured wheel assembly with a portion of the outer surface thereof in proximate engagement with said lateral guide surface of said base member while such wheel assembly is substantially laterally positioned adjacnet thereto with at least a portion of the width of such configured wheel assembly in engagement with the lateral stop surface of said cross member.

* * * * *

UNITED STATES PATENT AND TRADEMARK OFFICE
CERTIFICATE OF CORRECTION

PATENT NO. : 5,040,302

DATED : 8/20/91

INVENTOR(S) : Stephen P. Theising

It is certified that error appears in the above-identified patent and that said Letters Patent is hereby corrected as shown below:

Col. 1, line 64, "meals" should be --means--.

Col. 3, line 29, "Fig." should be --FIG.--.

Col. 6, line 32, "sad" should be --said--.

Col. 10, line 17, "adjacnet" should be --adjacent--.

Signed and Sealed this

Third Day of November, 1992

Attest:

DOUGLAS B. COMER

Attesting Officer      Acting Commissioner of Patents and Trademarks